United States Patent
Jacobs et al.

(10) Patent No.: US 6,296,967 B1
(45) Date of Patent: Oct. 2, 2001

(54) LITHIUM BATTERY STRUCTURE INCORPORATING LITHIUM POUCH CELLS

(75) Inventors: James K. Jacobs; Sankar Dasgupta, both of Toronto (CA)

(73) Assignee: Electrofuel Inc., Toronto (CA)

( * ) Notice: Subject to any disclaimer, the term of this patent is extended or adjusted under 35 U.S.C. 154(b) by 0 days.

(21) Appl. No.: 09/404,603

(22) Filed: Sep. 24, 1999

(51) Int. Cl.$^7$ ............ H01M 2/06; H01M 2/08; H01M 10/48

(52) U.S. Cl. ............ 429/93; 429/181; 429/185

(58) Field of Search ........... 429/92–93, 99–100, 429/127, 152–154, 158–160, 162–163, 170–171, 175–176, 178–181, 185

(56) References Cited

U.S. PATENT DOCUMENTS

| | | | |
|---|---|---|---|
| 3,915,749 | * 10/1975 | Weidlich . | |
| 4,060,670 | 11/1977 | Tamminen | 429/154 |
| 4,092,464 | 5/1978 | Dey et al. | 429/127 |
| 4,125,680 | 11/1978 | Shropshire et al. | 429/4 |
| 4,145,485 | 3/1979 | Kinsman | 429/105 |
| 4,169,920 | 10/1979 | Epstein | 429/154 |
| 4,374,186 | 2/1983 | Mccartney et al. | 429/154 |
| 4,554,221 | 11/1985 | Schmid | 429/1 |
| 4,623,598 | 11/1986 | Waki et al. | 429/162 |
| 4,659,636 | 4/1987 | Suzuki et al. | 429/54 |
| 4,664,994 | 5/1987 | Koike et al. | 429/163 |
| 4,678,725 | 7/1987 | Kikuchi et al. | 429/53 |
| 4,719,159 | 1/1988 | Clark et al. | 429/159 |
| 4,761,351 | 8/1988 | Voorn | 429/50 |
| 4,830,936 | 5/1989 | Planchat et al. | 429/110 |
| 4,997,732 | 3/1991 | Austin et al. | 429/153 |
| 5,017,441 | 5/1991 | Lindner | 429/9 |
| 5,057,385 | 10/1991 | Hope et al. | 429/162 |
| 5,326,653 | 7/1994 | Chang | 429/162 |
| 5,368,958 | 11/1994 | Hirai et al. | 429/211 |
| 5,368,959 | 11/1994 | Koksbang et al. | 429/212 |
| 5,405,715 | 4/1995 | Dawson et al. | 429/54 |
| 5,422,200 | 6/1995 | Hope et al. | 429/157 |
| 5,445,856 | 8/1995 | Chaloner-Gill | 428/35.9 |
| 5,487,958 | 1/1996 | Tura | 429/151 |
| 5,637,418 | * 6/1997 | Brown et al. . | |
| 5,728,488 | 3/1998 | Kranz et al. | 429/120 |
| 5,730,761 | 3/1998 | Lake et al. | 29/623.2 |
| 5,731,100 | 3/1998 | Fritts et al. | 429/84 |
| 5,736,271 | * 4/1998 | Cisar et al. . | |
| 5,744,261 | 4/1998 | Muffoletto et al. | 429/131 |
| 5,883,492 | * 3/1999 | Koenck . | |
| 6,146,778 | * 11/2000 | Rouillard et al. . | |

FOREIGN PATENT DOCUMENTS

| | | | | |
|---|---|---|---|---|
| 0 834 934 A1 | 8/1998 | (EP) | | H01M/2/02 |
| 0 917 218 A2 | 5/1999 | (EP) | | H01M/2/02 |
| 60-49568-A | * 3/1985 | (JP) . | | |
| 61114464 | 2/1986 | (JP) | | H01M/2/02 |
| 06150974 | 5/1994 | (JP) | | H01M/10/40 |

* cited by examiner

*Primary Examiner*—Stephen Kalafut
*Assistant Examiner*—Susy Tsang
(74) *Attorney, Agent, or Firm*—Gowling Lafleur Henderson LLP

(57) ABSTRACT

A lithium battery having a plurality of interconnected pouch cells encased in a first cover which is substantially impermeable to moisture ingress and electrolyte egress. The first cover is surrounded by a rigid outer cover which is sealed in a substantially moisture impervious manner. Positive, negative and monitoring leads extend in a sealed manner through the first cover and are connected to a charge monitoring and controlling circuit board. The circuit board may be located within or outside of the outer cover. Positive and negative terminals on and outside of the outer cover are respectively connected to positive and negative leads which extend through the outer cover in a substantially fluid sealed manner.

19 Claims, 3 Drawing Sheets

LITHIUM BATTERY STRUCTURE INCORPORATING LITHIUM POUCH CELLS

FIELD OF THE INVENTION

This invention relates to single cell as well as multi-cell lithium batteries and more particularly to the encasing of a plurality of foil packaged cell or cells in such batteries.

BACKGROUND OF THE INVENTION

Lithium batteries, which in this application refers to both lithium ion batteries and batteries having a lithium electrode, must be sealed in a substantially moisture and oxygen impervious manner to avoid undesirable reactions with an electrolyte. Generally a "battery" will include one or a plurality of interconnected lithium "cells" with each cell usually being separately sealed. For applications such as cellular phones, a single cell is the usual power source.

Lithium batteries usually operate with non-aqueous electrolytes. The electrolyte can be a solid polymer bearing a dissociable lithium salt, but frequently the electrolyte is a liquid in which a lithium salt has been dissolved. The liquid commonly impregnates a porous polymer separator laminate which can be multilayered, or in some instances the porous separator is itself a lithium salt containing polymer laminate. The liquid in which the lithium salt is dissolved, can be ethylene carbonate, propylene carbonate or other alkyl radical bearing carbonates, or a similar organic compound, which has boiling point above 50° C. and relatively low vapour pressure at room temperature. The electrolyte layer is located between the electrodes. Laminar lithium batteries are constructed of at least three layers, and the layered construction together with current carriers, is wrapped in a pliable polymer laminate container which thus forms a pouch.

As suggested above, one manner of sealing a lithium cell, and what is referred to herein as "sealed pouch cells" is to encase the cell in a plastic laminate covered foil pouch, the foil usually being of aluminium. Such an arrangement is shown in FIG. 1 which is a partially cut away perspective view of a sealed pouch cell. The cell, generally indicated by reference 10 has a positive electrode 12, a negative electrode 14, an electrolyte 16 and positive and negative "leads" or "current collectors" 18 and 20 respectively enclosed in a foil pouch 22. The leads 18 and 20 provide electrical communication between the positive and negative electrodes, 12 and 14 respectively, and an outside of the pouch 22.

The foil pouch 22 has an inner face 24 coated with a polymer laminate to both protect the foil from the electrolyte 16 and to prevent short circuiting between the positive electrode 12 and negative electrode 14 and the leads 18 and 20. Preferably the foil pouch 22 is also coated on its outer face with a polymer laminate.

The foil pouch 22 is heat sealed along three edges 26. A fourth edge 28 is typically formed by folding the foil from which the pouch is constructed and therefore does not require heat sealing. In order to ensure against the leads 18 and 20 coming into contact with the foil, particularly during the heat sealing operation, a separate insulating sleeve 30 is generally placed over each of the leads 18 and 20 in the vicinity of the edges 26 prior to heat sealing. The insulated sleeves 30 should form a seal and not act as an avenue for moisture ingress or electrolyte egress. Such a seal is referred to herein as "hermetically sealed".

For obvious reasons lithium batteries are sensitive to moisture and atmospheric corrosion, therefore the polymer pouches are sealed, usually by applying pressure and heat around the edges of the polymer laminate. Heat sealing a polymer laminate to another polymer laminate usually provides a very satisfactory bond, however the metallic leads or current collectors exiting in between the polymer layers may provide incomplete sealing, possibly resulting in seepage of the electrolyte liquid in spite of all efforts of to achieve a fast seal.

Although sealed pouch cells have numerous advantages associated with their construction and relatively thin profile, they are more easily damaged than cells encased in a more rigid enclosure. This poses significant problems as lithium batteries, particularly in rechargeable format, generally are used in expensive electronic equipment where damage through leakage is potentially very costly and totally unacceptable.

The leads 18 and 20 generally take the form of metal tabs, usually of aluminium, copper or nickel, which must be of sufficient thickness and size to carry a substantial amount of current without any appreciable voltage drop. This presents at least two problems in sealing the foil pouch around the area where the metal tabs exit. A first problem is that the metal tabs remove heat rapidly during the heat sealing and hence, provide uncertain sealing temperature control. Further, the metal tabs because of their thickness cause non-homogenous pressure which also leads to sealing uncertainty. As mentioned earlier, the lithium cells cannot tolerate ingress of moisture or oxygen or egress of electrolyte from the cell. Such leakage would lead to disaster for the cells and may also damage the equipment utilizing the battery or cell.

Further problems also arise through the diffusion of water molecules and oxygen through the polymer seal surface, which is that area of the polymer seal parallelled to the metal in the foil pouch. Water molecule as well as oxygen molecule diffusion through a metal is extremely low, however, water molecule and oxygen molecule diffusion through a polymer body is quite substantial. Hence, this destructive diffusion through the polymer sealing surface deteriorates the cell performance and leads to short life. Lithium cell applications whether for electric vehicles or laptop computers or cellular phones demand long life and cannot tolerate any cell failure through water and oxygen ingress. Also in a battery stack made with multiple cells, early failure in a single cell will lead to disaster for the complete battery pack. Because of these problems, lithium cells and batteries formed in foil pouches have not had any commercial success in spite of billions of dollars spent on its research and commercialization.

It is an object of this invention to provide a lithium battery which is resistant to mechanical damage and is at least doubly sealed against leakage.

It is a further object of the present invention to provide an enclosure for a lithium battery which is mechanically robust and forms an effective seal against moisture ingress and electrolyte egress.

SUMMARY OF THE INVENTION

A lithium battery having at least one electrolyte containing sealed pouch cells encased in a first cover which is substantially impermeable to moisture ingress and electrolyte egress. At least a positive and a negative lead extend from the pouch cells through a sealed aperture in the first cover. A substantially rigid outer cover surrounds the first cover in a substantially moisture impervious manner. The outer cover is substantially non-reactive with the electrolyte and provides at least some mechanical protection and a moisture seal. Positive and negative terminals on and outside of the outer cover are respectively connected to the positive and negative leads by respective conductors which extend through the outer cover in a substantially fluid sealed manner.

The lithium battery may include a charge monitoring and controlling circuit board connected to the positive and negative leads and also any interconnecting leads which interconnect a plurality of pouch cells in a desired arrangement. The charge monitoring and controlling circuit board may be located inside or outside the outer cover. Optionally the charge monitoring and controlling circuit may be located between the pouch and the first cover.

The outer cover may be of a plastics material. The plastics material may be selected to allow a liquid portion of the electrolyte to diffuse therethrough at a rate not exceeding that at which the liquid portion can evaporate to avoid the appearance of liquid on and outside of the outer cover.

DESCRIPTION OF DRAWINGS

Preferred embodiments of the invention will be described below with reference to the accompanying drawings in which.

DESCRIPTION OF PREFERRED EMBODIMENTS

Figure 1:
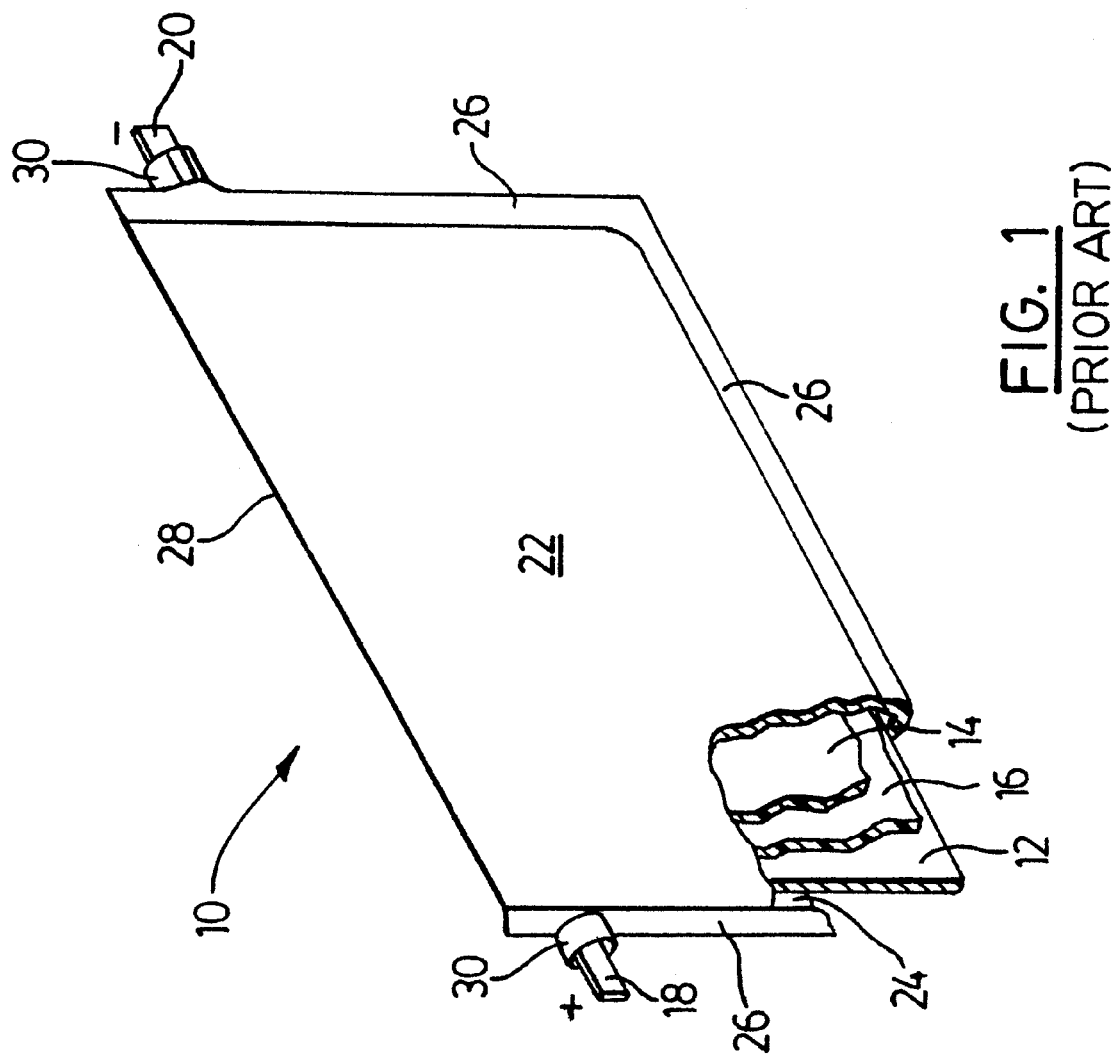
FIG. 1 is a partially cut-away perspective view of a prior art pouch cell.
Figure 2:
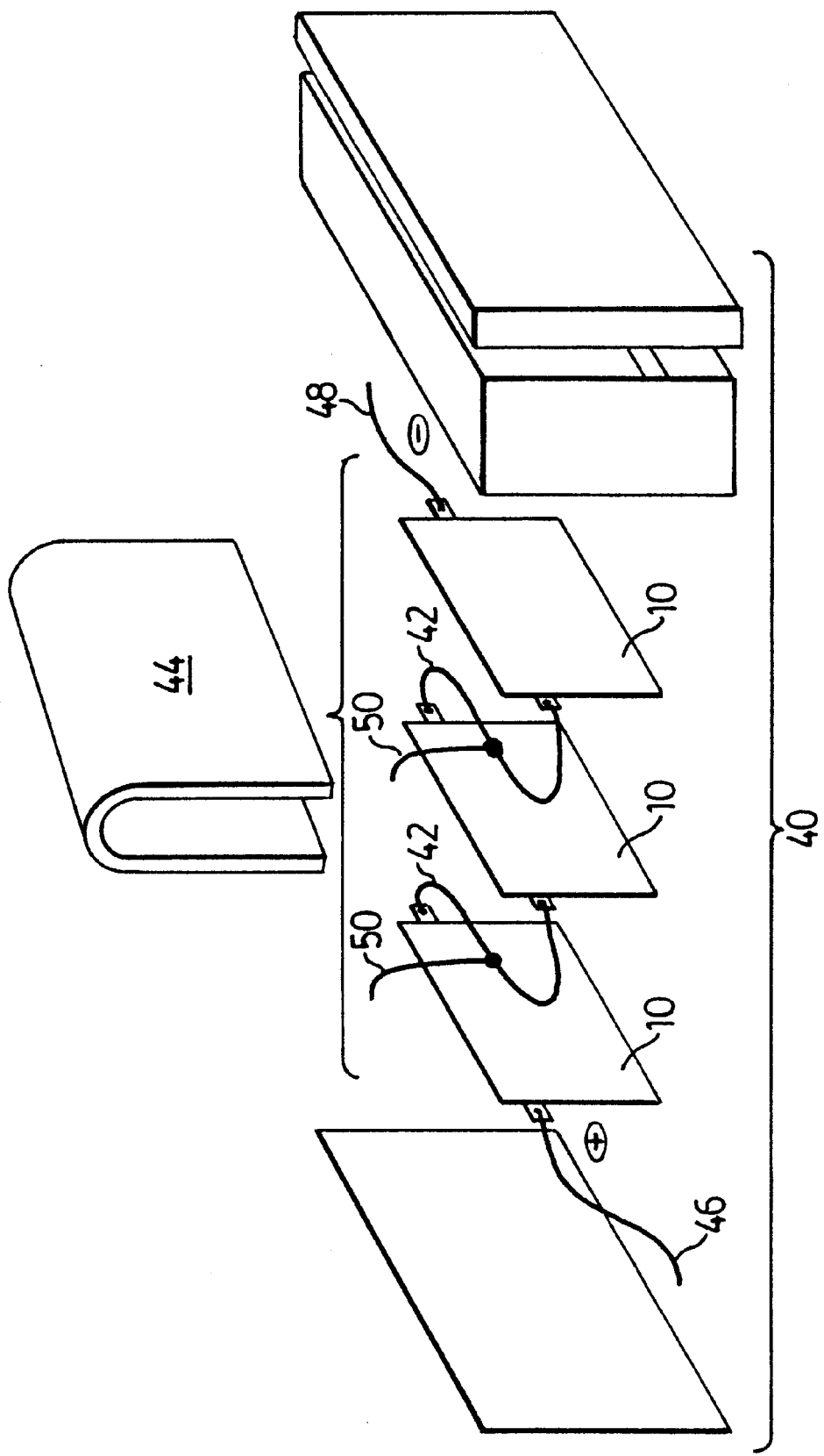
FIG. 2 is an exploded view of a lithium battery according to the present invention.
Figure 3:
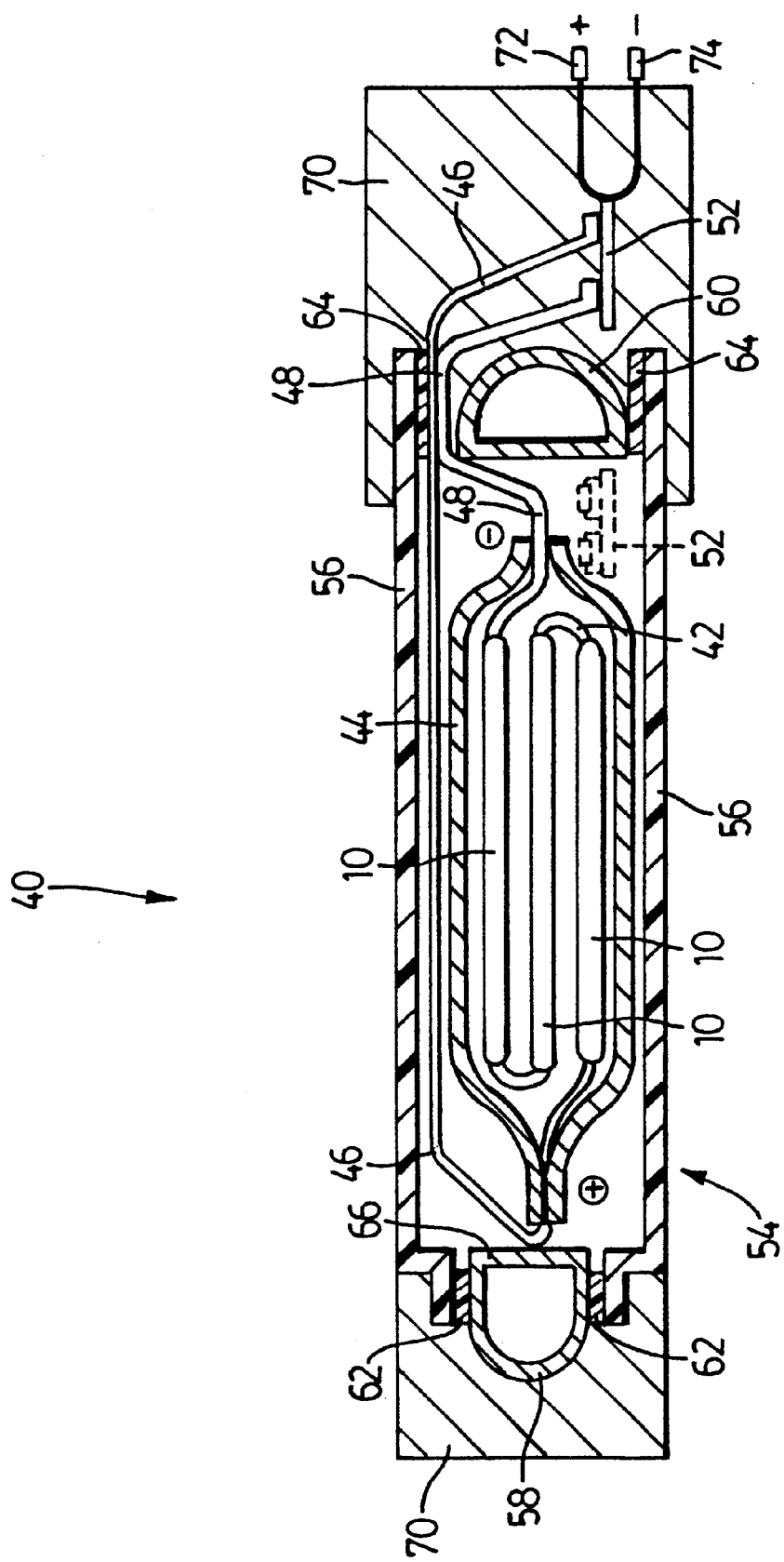
FIG. 3 is a cross-section through a lithium battery according to the present invention.

A lithium battery according to the present invention is generally indicated by reference 40 in FIGS. 2 and 3. The lithium battery 40 has a plurality of sealed pouch cells 10 (of the type described in the background above), interconnected in a desired arrangement by interconnecting leads 42. Three pouch cells 10 are illustrated but any desired or required number could be used. For example, some lithium batteries may only require one pouch cell 10 and reference to pouch cells herein should be interpreted to include the singular where the overall structure admits to such an interpretation. The interconnections may be series, parallel or a combination thereof depending on voltage and storage capacity requirements.

The pouch cells 10 are encased in a first cover 44 which may be a further plastic laminated foil pouch similar to the foil pouch 22 encasing each pouch cell 10, although no doubt a more rigid structure could be used if desired. The first cover 44 must be substantially impermeable to moisture ingress and electrolyte egress. The first cover 44 may be of a heat-sealable plastic and may be of more than one layer. The first cover 44 acts as a backup should any of the pouches 22 begin to leak.

Preferably egress of electrolyte should be kept below 2 mg/day weight loss of each packaged and sealed first cover 44, when the first cover 44 houses two pouch cells 10. When the first cover 44 contains more than two pouch cells 10, the weight loss may be proportionately larger. Preferably the ingress of moisture should be less than 0.2 mg water per day retained in each pouch cell 10. On an experimental basis, ingress of moisture can be determined by opening up each pouch cell 10 and determining the water absorbed in each pouch by Carl-Fischer titration.

At least a positive lead 46 and a negative lead 48 extend from the series of pouch cells 10 through the first cover 44 in a hermetically sealed manner. Typically monitoring leads 50 in FIG. 2 will also extend from the interconnecting leads 42 through the first cover 44 where the battery 40 contains more than one pouch cell 10. The monitoring leads 50 are connected to a charge monitoring and controlling circuit board 52, two alternate locations for which are shown in FIG. 3 and discussed below.

Where only one pouch cell is encased in the first cover 44, the positive lead 46 and negative lead 48 would typically be extensions of the positive lead 18 and negative lead 20 respectively of the sealed pouch cell 10. Accordingly, in such an arrangement, the positive and negative leads 18 and 20 respectively may be considered as "double sealed". The first cover 44 acts as a reservoir to contain any electrolyte leakage between the pouch 22 of the pouch cell 10 and the positive and negative leads 18 and 20 respectively.

The first cover 44 may additionally be surrounded by a substantially rigid outer cover generally indicated by reference 54 in FIG. 3. The outer cover 54 has side walls 56, a first end wall 58 and a second end wall 60. The first end wall 58 is sealingly joined to the side walls 56 at a first juncture 62. The second end wall 60 is sealingly joined to the side walls 56 at a second juncture 64. The outer cover 54 is primarily for mechanical protection of the lithium battery, but in a preferred embodiment acts as an additional barrier to prevent electrolyte egress and moisture ingress.

The outer cover 54 may be a rigid plastic, a semi-rigid plastic, cast epoxy, a rubber compound or a metal box. If a metal box is selected it may have a plastic laminate lining throughout or plastic insulating sleeves such as the insulated sleeves 30 may be used around the positive and negative leads, 46 and 48 respectively, where they exit the outer cover 54.

The positive lead 46 and negative lead 48 extend through the second juncture 64 preferably in a sealed manner. The positive and negative leads, 46 and 48 respectively, would usually be connected to a charge monitoring and controlling circuit board 52 as would any monitoring leads (50 in FIG. 2, not illustrated in FIG. 3). The positive lead 46 and negative lead 48 must of course be electrically isolated to avoid short circuiting therebetween. The circuit board 52 may be located within the outer cover 54 as shown in dashed outline in FIG. 3. Alternatively, as shown in solid outline in FIG. 3, the circuit board 52 may be located outside of the outer cover 54 in which case any charge monitoring leads would also have to pass through the second juncture in a sealed manner. In another embodiment (not shown), the circuit board 52 may be separate from the lithium battery 40. In such a case, it would be necessary to provide external connection to the monitoring leads 50.

The method of sealing the first juncture 62 and the second juncture 64 will depend upon the material of the outer cover 54. If the outer cover 54 is of solderable metal (for example tin or copper), the first juncture 62 may be a solder joint and the second juncture 62 may substantially be a solder joint, except for where any leads such as the positive lead 46 and negative lead 48 and any monitoring leads 50 extend through the second juncture 62. Alternate sealing means such as an epoxy or other sealant would typically be used around any leads.

If the outer cover 56 is of a plastics material, the first and second junctures 62 and 64 respectively, could be adhesively joined or joined in any other suitable manner, (such as heat or ultrasonic welding, with appropriate allowances being made of course for any leads extending through the second juncture 64.

As the individual pouch cells 10 and first cover 44 are sealed against moisture ingress and electrolyte egress, it is not absolutely necessary for the outer cover 54, if one is used, to also seal against oxygen ingress. The outer cover 54 acts as mechanical protection for the first cover 44 and to prevent egress of any electrolyte which should escape the pouch cells 10 and first cover 44. More than one first cover 44 containing pouch cells 10 may be housed in a single outer cover 54.

The outer cover 54 may be of a material that allows a liquid portion of the electrolyte to diffuse therethrough at a controlled rate not exceeding the rate at which the liquid can evaporate so as not to have any liquid appear on an outside of the outer cover 54. Suitable plastics for allowing controlled diffusion include polypropylene, polyethylene and ethyl acrylic polymers. If controlled diffusion is not required, other plastics may be selected.

If the outer cover 54 is of metal, a non-conductive coating could be applied to an inside surface 66 to prevent any unwanted inadvertent electrical communication between the outer cover 54 and any components contained therein. Alternatively, each first cover 44 may be wrapped or sealed in plastic.

As a further seal at the first and second junctures, 62 and 64 respectively, the ends of the outer cover 54 may be encased in a rubber compound 70 and in fact the whole outer cover can be encased in a molded overlay of rubber or plastics material. If the outer cover 54 is of metal, the rubber compound 70 may be selected to permit controlled diffusion of the liquid portion of the electrolyte in the manner discussed above. The rubber compound 70 acts as a further seal and also provides a cushion over the first juncture 62 and second juncture 64 to prevent mechanical damage. The circuit board 52 may be molded into the rubberized coating 70.

Positive and negative terminals 72 and 74 respectively are provided outside of the rubber compound 70 to enable electrical connection to be made to the lithium battery 40.

The above is intended in an illustrative rather than a restrictive sense. Variations to the exact description may occur to persons skilled in the art of battery construction without departing from the spirit and scope of the invention as defined in the claims set out below.

What is claimed is:

1. A lithium battery comprising:
a plurality of electrically interconnected, electrolyte containing, sealed pouch cells encased in a first cover which is substantially impermeable to moisture ingress and electrolyte egress;
at least a positive lead and a negative lead extending, in a moisture and oxygen sealed manner from said pouch cells through said first cover;
a substantially rigid outer cover surrounding said first cover in substantially moisture impervious manner, said outer cover being substantially non-reactive with said electrolyte; and,
positive and negative terminals on an outside of said outer cover respectively connected to said positive and said negative leads by respective conductors which extend through said outer cover in a substantially fluid sealed manner.

2. The lithium battery as claimed in claim 1 wherein:
said sealed pouch cells are interconnected by interconnecting leads;
said positive and negative leads are connected to a charge monitoring and controlling circuit board;
said positive and negative terminals are also connected to said circuit board; and
monitoring leads extend between a plurality of said interconnecting leads and said circuit board.

3. The lithium battery as claimed in claim 2 wherein:
said charge monitoring and controlling circuit board is located inside said outer cover.

4. The lithium battery as claimed in claim 2 wherein:
said charge monitoring and controlling circuit board is located outside of said outer cover.

5. The lithium battery as claimed in claim 3 or 4 wherein said outer cover is of a material which permits diffusion of a liquid portion of said electrolyte therethrough at a rate not exceeding a rate at which said liquid portion can evaporate from said outer cover.

6. The lithium battery as claimed in claim 5 wherein said first cover is of plastic laminate covered metal foil and said outer cover is of a material selected from the group consisting of polypropylene, polyethylene and ethyl acrylic plastic polymers.

7. The lithium battery as claimed in claim 1, 2, 3 or 4 wherein said outer cover is metal and is coated at least on an inside face with a non-conductive coating.

8. The lithium battery as claimed in claim 5 wherein said outer cove is metal and is coated at least on an inside face with a non-conductive coating.

9. A lithium battery comprising:
a plurality of sealed pouch cells in a hermetically sealed first cover placed in a substantially rigid box having side walls and first and second opposite end walls;
said first end wall is sealingly joined to said side walls at a first juncture;
said first end wall and said first juncture ar2 encased in a rubberized coating which sealingly engages said first end wall and said side walls, at least across said first juncture;
said second end wall is sealingly joined to said side walls at a second juncture;
said plurality of sealed pouch cells are interconnected by interconnecting leads to at least one positive lead and one negative lead;
said positive and negative leads extend through said first cover in a hermetically sealed manner and through said second juncture in at least a moisture sealed manner;
said second end wall and second juncture are encased in a rubberized coating; and,
said positive and negative leads are connected to respective positive and negative terminals which extend through said rubberized coating encasing said second end.

10. The lithium battery as claimed in claim 9 wherein:
said positive and negative leads are connected to a charge monitoring and controlling circuit board;
said positive and negative terminals are also connected to said circuit board;
monitoring leads extend between interconnecting leads and said circuit board; and,
said monitoring leads extend through said first cover in a hermetically sealed manner.

11. The lithium battery as claimed in claim 10 wherein said charge monitoring and controlling circuit board is located inside said box.

12. The lithium battery as claimed in claim 10 wherein:
said circuit board is located, outside of said box and encased in said rubberized coating encasing said second end of said box.

13. The lithium battery as claimed in claim 10, 11 or 12 wherein:
   said box is made of solderable metal;
   said first end is sealed to said side walls with solder;
   said second end is sealed to said side walls with solder except where any of said positive, negative and monitoring leads extend through said second juncture,
   said second end is adhesively sealed to said side walls where any of said positive, negative and monitoring leads extend through said second juncture.

14. The lithium battery as claimed in claim 9, 10, 11 or 12 wherein said rubberized coating is of a rubber compound which permits diffusion of an electrolyte from said cells therethrough at a rate not exceeding a rate at which said electrolyte can evaporate.

15. The lithium battery as claimed it claim 13 wherein said rubberized coating is of a rubber compound which permits diffusion of an electrolyte from said cells therethrough at a rate not exceeding a rate at which said electrolyte can evaporate.

16. The lithium battery as claimed in claim 14 wherein said box has an inner surface of a non-conductive material.

17. The lithium battery as claimed in claim 15 wherein said box has an inner surface of a nonconductive material.

18. The lithium battery as claimed in claim 9, 10, 11, or 12 wherein said box is made of a plastics material.

19. The lithium battery as claimed in claim 18 wherein said rubberized coating is of a rubber compound which permits diffusion of an electrolyte from said cells therethrough at a rate not exceeding an evaporation rate of said electrolyte.

* * * * *